United States Patent Office 3,679,591
Patented July 25, 1972

---

3,679,591
METHOD AND COMPOSITION FOR STRIPPING STRUCTURAL ADHESIVES AND THE LIKE
Gilberto Carrillo, Riverside, Calif., assignor to Rohr Corporation, Chula Vista, Calif.
No Drawing. Filed Dec. 1, 1969, Ser. No. 881,328
Int. Cl. C11d 7/08
U.S. Cl. 252—142
9 Claims

ABSTRACT OF THE DISCLOSURE

A mixture is composed of concentrated nitric acid and a strong oxidizing agent, with an optimum mixture formulation of 86 percent $HNO_3$ (42° Bé.) and 7 percent each of $H_2O$ and $CrO_3$. The mixture can be used as a bath for items contaminated with cured structural adhesives, primers and paints, and the like, or have added thereto a filler to provide a paint-like mixture selectively applied to the items with a brush. In the case of the optimum mixture, the contaminants are stripped from the items in from about one-quarter to about one-half hour, with no adverse effect on the surfaces of the items. The items are then thoroughly rinsed with water or other solvent.

BACKGROUND OF INVENTION

The present invention relates to new compositions of matter and their preparation, and more particularly to such compositions which are especially useful in stripping cured structural adhesives, such as cured epoxies, phenolics, and the like, from metal and metal alloy surfaces without adverse effect on the surfaces.

In the aircraft and aerospace industry, wide use is made of adhesives, paints and primers, for fabricating structural components or items, such as honeycomb panels and the like. Oftentimes, more than enough adhesive is applied to a joint with the result that an amount thereof runs out from the joint during curing onto a surface that it is desired to maintain clear and uncontaminated. Also, some of the excess adhesive rubs off on other items, contaminating the same. Since items with exposed surfaces that are contaminated or otherwise marred are not acceptable to the customer, effort must be expended in stripping the undesired adhesive or other contaminant from the item, which adds to the cost thereof. Heretofore, the contaminants have been removed by grinding. Such method of removal has not proved entirely satisfactory, the surface often being abraded or scratched in the process and so marred as to be unacceptable.

Although various attempts have been made to provide a suitable composition of matter for stripping the undesired adhesive and the like, none are known which have proved to be effective.

SUMMARY OF INVENTION

Accordingly, the present invention is concerned with a novel composition of matter and method of use which provides a mixture containing a strong oxidizing agent and concentrated nitric acid found to be useful and extremely effective in stripping cured structural adhesives of the epoxy, phenolic and polyimide types, and other contaminants from metallic surfaces. Preferably, the major ingredient of the mixture is concentrated nitric acid and the strong oxidizing agent can be chromic acid, or potassium permanganate. The mixture can be applied, for a predetermined period of time, by immersing the contaminated item therein, or with a brush as a paint by adding a suitable filler to the mixture. After the contaminant has been stripped off, the item is rinsed with water or other solvent.

DESCRIPTION OF INVENTION

As previously stated, various attempts had been made to provide a suitable stripping composition for structural adhesives. However, the attempted compositions were ineffective, apparently because of being too mild. Experiments were carried out by applicant with chromic acid flakes and nitric acid which initially were not completely successful but upon the addition of water and with other changes resulted in the stripping composition of the present invention, as illustrated by the following representative examples.

EXAMPLE I

Chromic acid flakes were mixed with nitric acid. A metal plate with cured modified epoxy adhesive thereon was immersed in the mixture for several hours with some visible effect on the adhesive. It was observed that most of the chromic acid flakes went to the bottom of the container and did not go into solution.

EXAMPLE II

A mixture was prepared of:

$CrO_3$ ----------------------------------------gm-- 10
$H_2O$ -----------------------------------------gm-- 25
$HNO_3$ (42° Bé.) ------------------------------cc-- 75

An aluminum plate with cured modified epoxy adhesive thereon was immersed in the mixture for three hours. The adhesive softened but did not strip away.

EXAMPLE III

Enough water was added to 10 grams of $CrO_3$ to dissolve it. This produced about 10 cc. of chromic acid which was mixed with 90 cc. of concentrated nitric acid. An aluminum plate with cured modified epoxy adhesive thereon was immersed in the mixture and in about 15 minutes the adhesive sloughed off, leaving a clean metal surface which was rinsed with water.

EXAMPLE IV

Except for the use of $KMnO_4$ in place of $CrO_3$, this example was similar to Example III, with substantially similar immersion and end results.

EXAMPLE V

Ten percent by weight of chromic acid flakes was dissolved in 10 percent by weight of water and the solution was mixed with 80 percent by weight of concentrated nitric acid. The mixture was applied to test specimens having coatings of cured epoxy type structural adhesives. Coatings having a thickness from about three to about eight mils were stripped after immersion from about one-quarter hour to about one-half hour. Coatings of one mil or so took only three to five minutes.

EXAMPLE VI

This example was similar to Example V except that potassium permanganate was employed instead of the chromic acid flakes, with a reduction in the number of specimens tested and greater selectivity with respect thereto. The application procedures and results were substantially the same as in the previous example.

EXAMPLE VII

Mixed with 60 percent by weight of concentrated nitric acid were 20 percent by weight each of chromic acid flakes and water. Test specimens with three to eight mil cured adhesive coatings required immersion up to two hours before the coatings were stripped.

Additional tests were performed varying the concentrated nitric acid from about 40 to about 90 percent by weight, the weight of water and chromic acid flakes each being varied from about 5 percent to about 30 percent. The several mixtures were applied to test specimens and contaminated structural parts having cured coatings of primers, paints and structural adhesives, such as epoxies, modified epoxies, nitrile epoxies, phenolics, nitrile phenolics, epoxy phenolics, nitriles and polyimides, varying in thickness. In the case of the lower nitric acid percentages, the stripping took longer than for the higher percentages. The thicker coatings also took longer than the thinner ones.

Application of the mixtures was mainly by immersion. For more selective application or spotting, fused silica in powder form was added as a filler until the mixture had a paint-like consistency and was applied with a brush. Any of the mixtures with a suitable filler can also be packed for application by extrusion.

The effect of the mixtures on the various test specimens was observed and it was determined that stainless and heat resistant steels, aluminum and titanium, and alloys of each, are not adversely affected, if not treated for extensively long periods by the mixtures. Mild steels were attacked.

In the case of great thicknesses of adhesives, it is recommended that they be ground down to about three or four mils, which can be easily done without danger of marring the metallic surface. This will reduce the amount of application time required and avoid possible harm to the surface of the item being treated. In any event, the item should be thoroughly rinsed with water or other suitable solvent after treatment.

It was concluded that, for best results, the weights of the oxidizing agent and water should be equal, and that the optimum mixture is as expressed in the following example:

EXAMPLE VIII

| | Percent by wt. |
|---|---|
| $CrO_3$ | 7 |
| $H_2O$ | 7 |
| $HNO_3$ (42° Bé) | 86 |

Items with three to eight mil contaminant coatings were stripped in 10–30 minutes.

It is believed that the use and operation of the stripping composition of the present invention is apparent and is briefly summarized at this point. A mixture is prepared in accordance with the effective examples cited above. The mixture can be used as a bath or thickened with a suitable filler for application as a paint or paste. The mixture is applied to an item contaminated with cured structural adhesives, primers or paints. Thick coatings of contaminants are ground down prior to application of the stripping mixture. After stripping, the item is thoroughly rinsed with water or other solvent.

There has thus been provided a novel stripping composition which is especially useful in stripping cured structural adhesives, primers, paints, and the like, from aircraft structural parts contaminated thereby, without adverse effect on the surfaces of the parts.

Although the present invention has herein been described in what are believed to be the most practical and preferred embodiments thereof, it will be understood by those skilled in the art that various changes and modifications can be made in the practice of the invention without being limited to the details disclosed herein.

What is claimed as new and useful and is desired to be secured by U.S. Letters Patent is:

1. A method for stripping cured structural adhesives, primers, paints, and the like, from metal items contaminated thereby, comprising the steps of:
   (a) Applying a mixture of concentrated nitric acid and a strong oxidizing agent to a contaminated metal item, said applied mixture consisting essentially of from about 80 percent to about 90 percent by weight of nitric acid (42° Bé) and from about 10 percent to about 20 percent by weight of an oxidizing agent selected from the group consisting of chromic acid, and potassium permanganate; and the balance water;
   (b) keeping the applied mixture in contact with the contaminated metal item until the contaminants have been stripped therefrom; and
   (c) thereafter removing the applied mixture from the metal item.

2. The method of claim 1 in which the applied mixture is removed by rinsing with water.

3. The method of claim 1 in which the oxidizing agent consists essentially of equal weights of chromic acid flakes and water.

4. The method of claim 1 in which the oxidizing agent consists essentially of equal weights of potassium permanganate and water.

5. A composition of matter consisting essentially of from about 40 percent to about 90 percent by weight of concentrated nitric acid and from about 5 percent to about 35 percent each strong oxidizing agent selected from the group consisting of chromic acid, and potassium permanganate, and the balance water.

6. The composition of claim 5 in which the oxidizing agent includes a weight of water necessary to put a selected group member in solution.

7. The composition of claim 6 in which the weight of water equals the weight of the selected group member.

8. The composition of claim 5 in which the oxidizing agent is chromic acid and consists essentially of equal weights of $CrO_3$ and $H_2O$, together representing from about 10 percent to about 20 percent by weight of the mixture.

9. The composition of claim 5 in which the oxidizing agent is made up of equal weights of potassium permanganate and water and represents from about 10 percent to about 20 percent by weight of the mixture.

References Cited

UNITED STATES PATENTS

| 1,824,932 | 9/1931 | Schermer | 252—101 |
| 2,127,469 | 8/1938 | Wempel | 134—38 X |
| 2,762,694 | 9/1956 | Newman | 252—142 X |
| 2,762,728 | 9/1956 | Hahn | 252—101 X |
| 2,883,311 | 4/1959 | Halpert | 134—3 |
| 3,379,645 | 4/1968 | Kendall | 252—142 |

OTHER REFERENCES

Putilova, I. N. et al.: Metallic Corrosion Inhibitors, Pergamon Press, New York, 1960, p. 85–88.

LEON D. ROSDOL, Primary Examiner

W. E. SCHULZ, Assistant Examiner

U.S. Cl. X.R.

134—3, 38